Figure 1:
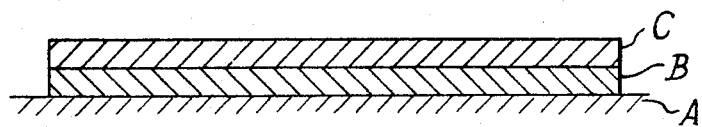

United States Patent
Keeling et al.

[15] 3,660,196
[45] May 2, 1972

[54] METHOD OF APPLYING TRANSFERS TO FIBER GLASS ARTICLES

[72] Inventors: Robert A. Keeling; John G. Priest, both of London, England

[73] Assignee: Johnson, Matthey & Co. Limited, London, England

[22] Filed: June 23, 1969

[21] Appl. No.: 840,124

Related U.S. Application Data

[63] Continuation of Ser. No. 665,319, Sept. 5, 1967.

[30] Foreign Application Priority Data

Sept. 5, 1966 Great Britain...................39,594/66

[52] U.S. Cl..............................156/235, 156/237, 156/239, 156/240, 156/247
[51] Int. Cl.....................B44c 3/02, B32b 31/12, B44d 1/14
[58] Field of Search.................156/230, 232, 235, 327, 239, 156/240, 241, 247, 249

[56] References Cited

UNITED STATES PATENTS

| | | | |
|---|---|---|---|
| 1,998,638 | 4/1935 | Reese | 156/241 X |
| 1,999,413 | 4/1935 | Hemming et al. | 156/237 |
| 2,351,933 | 6/1944 | Decker et al. | 156/249 X |
| 2,746,877 | 5/1956 | Matthes | 156/230 X |
| 3,065,120 | 11/1962 | Avelar | 156/240 X |
| 3,172,942 | 3/1965 | Berg | 156/247 X |
| 3,242,027 | 3/1966 | Dowda | 156/279 X |
| 3,309,254 | 3/1967 | Rowe | 156/240 |
| 3,334,003 | 8/1967 | Edwards | 156/240 X |

Primary Examiner—Carl D. Quarforth
Assistant Examiner—Roger S. Gaither
Attorney—Pierce, Scheffler & Parker

[57] ABSTRACT

There is provided a method of applying transfers or decalcomanias to a tacky surface particularly the surface of a partially cured fiber glass article. The transfer decalcomania includes a backing sheet, a first intermediate layer applied to the backing sheet and a design layer, with or without a second intermediate layer interposed between the first intermediate layer and the design layer. Where a second intermediate layer is not included, the first intermediate layer is such that the adhesion between it and the design layer is less than the adhesion between the first intermediate layer and the backing sheet and between the design layer and a tacky surface. Where a second intermediate layer is included, the adhesion between the said first and second layers is less than the adhesion respectively between the first intermediate layer and the backing sheet, the second intermediate layer and the design layer and the design layer and a tacky surface. The transfer may be applied to an initial resin coat applied to the inside of a mould after which the fiber glass article is completed by additional layers of fiber glass and resin whereby the design is embedded in the article and can be seen from the outside.

11 Claims, 4 Drawing Figures

INVENTORS

Robert Alan Keeling
John Garrick Priest

By Pierce Scheffler & Parker
Attorneys

METHOD OF APPLYING TRANSFERS TO FIBER GLASS ARTICLES

This application is a continuation of application Ser. No. 665,319 filed Sept. 5, 1967.

This invention relates to a method of applying transfers or decalcomanias herein referred to simply as "transfers" for the application of decorative patterns and the like to partially or completely finished resin-bonded fiber glass articles.

One way in which an article may be made from resin-bonded fiber glass is as follows. The inner surface of a mould which defines the outer surface of the article to be made is first coated with one or more layers of resin. Following this, a layer of fiber glass is applied to the resin layer and then alternate layers of resin and fiber glass are applied until the required thickness has been built up.

The whole assembly is built up before the resin in each layer is cured so that curing is only finally completed after the article has been assembled.

During the curing process, the resin passes through a stage when it becomes "tacky" and it is an object of the present invention to employ a transfer to apply a decorative pattern or the like direct to such a "tacky" surface.

We have found that a transfer suitable for the above purpose comprises a backing sheet, a first intermediate layer applied to the backing sheet and a design layer, with or without a second intermediate layer interposed between the first intermediate layer and the design layer.

The first intermediate layer is a so-called "release layer." In the case of a transfer which does not include a second intermediate layer, the first intermediate layer is such that the adhesion between it and the design layer is less than the adhesion between the first intermediate layer and the backing sheet and between the design layer and a tacky surface, such as a partly cured resin surface, to which the design layer is applied.

In the case of a transfer including first and second intermediate layers, the adhesion between these two layers is less than the adhesion respectively between the first intermediate layer and the backing sheet, the second intermediate layer and the design layer and the design layer and a tacky surface, such as a partly cured resin surface to which it is applied.

In use, the design layer of the transfer is simply applied to a suitable tacky surface, such as the surface of a partly cured resin layer during the manufacture of a resin-bonded fiber glass article, and the backing sheet is then peeled off, carrying with it the first intermediate layer. This leaves either the design layer alone or the design layer with an outer coating of the second intermediate layer secured to the tacky surface.

The purpose of the second intermediate layer is to act as a form of protective coating for the design layer and to facilitate the removal of the design layer intact from the transfer. When the backing sheet and first intermediate layer are removed from a transfer or decalcomania not provided with a second intermediate layer, there is always the possibility of small particles of the design layer adhering to and being carried away with the first intermediate layer.

The method of using the transfer to decorate a resin-bonded fiber glass article which is made by building up the various layers within the mould as previously described, is as follows. The initial resin coat applied to the inside of the mould is first allowed to become tacky. Following this, the transfer is used to apply a design layer to the tacky resin surface in the manner described above. Next, the design layer or the second intermediate layer, as the case may be, is coated with a layer of resin and then alternate layers of fiber glass and resin are applied until the required thickness has been built up. The design layer thus becomes embedded in and is located near the outer surface of the finished article.

Preferably a clear, near-transparent resin is used for the first coating on the inside surface of the mould. A suitable material for this purpose is an isophthalic polyester resin cured by means of a catalyst such as an organic peroxide.

In the case of a transfer which does not include a second intermediate layer, it is advantageous to coat the design layer with a resin which is loaded with a pigment, such as titanium dioxide. In this way, the design layer has a pigmented background when viewed from the outside of the finished article. When the transfer has a second intermediate layer this may itself be pigmented so as to form a pigmented background for the design layer. In this latter case the resin layer applied to the second intermediate layer may also be pigmented so as to "back up" the pigmented second intermediate layer. Alternatively, of course, an unpigmented resin may be used.

When a transfer according to the invention is used for the decoration of a fiber glass article, it is important that the material of which the design layer, and, where appropriate, the second intermediate layer is formed, shall be compatible with the resin used for the manufacture of the article.

One form of transfer according to the invention consists of a paper backing sheet at least one surface of which is coated which a silicone or polythene layer which constitutes the first intermediate layer. To this is applied either the design layer by the methods described below, or else a second intermediate layer. The second intermediate layer is applied to the first intermediate layer by spraying, dipping or brushing, or by some other suitable method, a clear or pigmented solution of a cellulosic derivative, such as cellulose nitrate in butyl lactate. When this layer is dry, the design layer is applied to its free surface by screen printing, lithography or some other conventional printing technique. The same method is used for the application of the design layer direct to the first intermediate layer when a second intermediate layer is not provided.

Two suitable formulations for the material which may be used for the application of the design layer are as follows:

| Formulation No. 1. | |
|---|---|
| Nitrocellulose | 13.2 wt.% |
| Amyl Lactate | 64.2 wt.% |
| Di-octyl phthalate | 3.6 wt.% |
| Pigment | 19.0 wt.% |
| | 100.0 wt.% |

| Formulation No. 2. | |
|---|---|
| Polybutyl methacrylate | 24.5 wt.% |
| Xylene | 62.0 wt.% |
| Phthalyl-glycollate | 1.3 wt.% |
| Pigment | 12.2 wt.% |
| | 100.0 wt.% |

Although the invention has been described with reference to the application of a decorative pattern to a partly finished resin-bonded fiber glass article during the initial stages of its manufacture so that the design is embedded in the finished article, the transfer of the invention is not, of course, so limited. The transfer could, for example, be applied to the surface of a finished resin-bonded fiber glass article, or indeed to any other suitable surface, by first applying a coating of a resin to the surface, allowing it to become tacky, applying the design layer of the transfer according to the invention to the tacky resin layer in the manner previously described and then, if required, applying a protective coating of resin to the design layer.

Where a tacky surface is allowed to dry or harden so as to become "tack" free, the transfer of the invention may be modified to include a layer of an adhesive which is applied to those areas of the intermediate layer which remain exposed after application of the design layer. Alternatively, the adhesive layer may be applied to both those parts of the intermediate layer which remain exposed and the design per se. The adhesive may be a modified ester of an acrylic acid.

The invention also includes a resin-bonded fiber glass article with a design layer embedded in it when this layer has been incorporated in the article by means of a transfer or decalcomania according to the invention.

In the accompanying drawings

Figure 2:
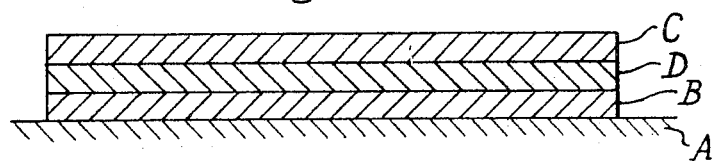
Figure 3:
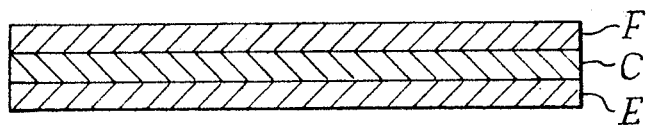
Figure 4:
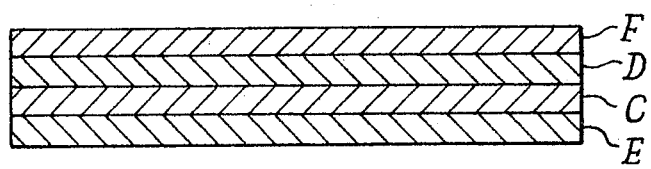

FIGS. 1 and 2 show, in section, two forms of transfer made in accordance with the invention, FIGS. 3 and 4 show, in section, fiber glass laminated articles including the transfers shown in FIGS. 1 and 2 respectively.

In FIG. 1, A is a backing layer B is a first intermediate layer or release coating and C is a design layer. The transfer of FIG.

2 differs from that shown in FIG. 1 in that there is included a second intermediate layer D between the first intermediate layer B and the design layer C.

As previously described, where a transfer is applied during the moulding of a fiber glass laminated article, the mould is first coated with a clear, near-transparent resin (see E FIGS. 3 and 4). The transfer is then applied to the layer E and, depending upon whether a transfer according to the FIG. 1 or FIG. 2 is used, will depend the existence or otherwise of the second intermediate layer D. Additional laminations F of resin and fiber glass are then applied until an article of required thickness has been built up.

We claim:

1. A method of applying a design to a resin-bonded fiber glass moulded body during the manufacture of said body which consists in coating the inner surface of a mould defining the outer surface of said body with at last one layer of a resin selected from the isophthalic polyester resins and adapted to be cured by means of a catalyst, applying a design layer to said resin coating, while said resin is partly cured and in a tacky condition, by means of a transfer comprising a backing sheet, a first intermediate layer on said backing sheet and a design layer applied to said intermediate layer, said design layer being applied to said partly cured resin coating, stripping said intermediate layer and said backing sheet from said design layer, coating said design layer with a layer of resin and applying alternate layers of fiber glass and of bonding resin to said last-mentioned resin layer until the required thickness of said moulded body is attained, whereby the design layer becomes embedded in, and is located near the outer surface of said moulded body.

2. A method as claimed in claim 1 wherein the transfer includes a pigmented resin layer interposed between said first intermediate layer and said design layer.

3. A method as claimed in claim 1 wherein the transfer includes a second intermediate protective layer interposed between said first intermediate layer and said design layer, said second intermediate layer being so selected that the adhesion between said first and second intermediate layers is less than the adhesion respectively between said first intermediate layer and and backing sheet, said second intermediate layer and said design layer and between said design layer and the partly cured resin surface to which said design layer is applied.

4. A method as claimed in claim 3 wherein the second intermediate layer of the transfer comprises a pigmented layer.

5. A method as claimed in claim 3 wherein the second intermediate layer of said transfer is formed of a cellulose derivative.

6. A method as claimed in claim 3 wherein the second intermediate layer is applied to said first intermediate layer in the form of a solution of cellulose nitrate in butyl lactate.

7. A method as claimed in claim 1 wherein the first intermediate layer comprises a silicone applied to at least one surface of the backing sheet.

8. A method as claimed in claim 1 wherein the first intermediate layer of said transfer consists of polythene.

9. A method as claimed in claim 1 wherein the design layer applied to said partly cured resin surface comprises 13.2 wt.% nitrocellulose, 64.2 wt.% amyl lactate, 3.6 wt.% dioctylphthalate and 19.0 wt.% of pigment.

10. A method as claimed in claim 1 wherein the design layer applied to said partly cured resin surface comprises 24.5 wt.% polybutyl methacrylate, 62.0 wt.% xylene, 1.3 wt% phthalylglycolate and 12.2 wt.% of pigment.

11. A method of applying a design to a resin-bonded fiber glass body during the manufacture of said body which consists in applying a transfer comprising a backing sheet, a first intermediate release layer applied to said sheet, a second intermediate layer applied to said first intermediate layer, a design layer applied to said second intermediate layer and a layer of adhesive selected from modified esters of an acrylic acid applied to at least those areas of said second intermediate layer which remain exposed after said design layer has been applied to said second intermediate layer, to a resin surface of said body with the design layer in contact with said resin surface, stripping said first intermediate release layer and backing sheet from said second intermediate layer and applying at least one further layer of the bonding resin to said second intermediate layer.

* * * * *